United States Patent
Cheng et al.

(10) Patent No.: US 8,037,575 B2
(45) Date of Patent: Oct. 18, 2011

(54) METHOD FOR SHAPE AND TIMING EQUIVALENT DIMENSION EXTRACTION

(75) Inventors: Ying-Chou Cheng, Sijhih (TW);
Chih-Ming Lai, Hsinchu (TW);
Ru-Gun Liu, Hsinchu (TW);
Tsong-Hua Ou, Taipei (TW);
Min-Hong Wu, Nantou County (TW);
Yih-Yuh Doong, Hsin-Chu (TW);
Hsiao-Shu Chao, Taipei (TW); Yi-Kan Cheng, Taipei (TW); Yao-Ching Ku, Hsinchu (TW); Cliff Hou, Taipei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 294 days.

(21) Appl. No.: 12/211,624

(22) Filed: Sep. 16, 2008

(65) Prior Publication Data
US 2009/0222785 A1    Sep. 3, 2009

Related U.S. Application Data (60) Provisional application No. 61/032,358, filed on Feb. 28, 2008.

(51) Int. Cl.
*G06F 17/50* (2006.01)
(52) U.S. Cl. .................................. 16/54; 716/55; 430/5
(58) Field of Classification Search .................... 716/54, 716/55; 430/5
See application file for complete search history.

(56) References Cited

U.S. PATENT DOCUMENTS

| | | | |
|---|---|---|---|
| 5,048,800 A | | 9/1991 | Miyazaki et al. |
| 5,440,478 A | | 8/1995 | Fisher et al. |
| 5,666,288 A | * | 9/1997 | Jones et al. ............ 716/17 |
| 5,847,965 A | | 12/1998 | Cheng |
| 5,963,881 A | | 10/1999 | Kahn et al. |
| 6,028,991 A | | 2/2000 | Akashi |
| 6,045,619 A | | 4/2000 | Tai et al. |
| 6,077,310 A | | 6/2000 | Yamamoto et al. |
| 6,289,257 B1 | | 9/2001 | Sekine |
| 6,408,219 B2 | | 6/2002 | Lamey, Jr. et al. |
| 6,410,351 B1 | | 6/2002 | Bode et al. |
| 6,453,447 B1 | * | 9/2002 | Gardner et al. ........... 716/3 |
| 6,549,864 B1 | | 4/2003 | Potyrailo |
| 6,795,952 B1 | * | 9/2004 | Stine et al. ............ 716/5 |
| 6,810,296 B2 | | 10/2004 | Bode et al. |
| 6,810,509 B2 | * | 10/2004 | Murakami ............ 716/4 |
| 6,917,849 B1 | | 7/2005 | Pasadyn et al. |
| 6,968,253 B2 | | 11/2005 | Mack et al. |
| 6,980,873 B2 | | 12/2005 | Shen |
| 7,144,297 B2 | | 12/2006 | Lin et al. |
| 7,177,788 B2 | * | 2/2007 | Roessiger ............ 703/13 |
| 7,216,320 B2 | * | 5/2007 | Chang et al. ............ 716/6 |
| 7,302,672 B2 | * | 11/2007 | Pack et al. ............ 716/19 |
| 7,360,191 B2 | * | 4/2008 | Chang et al. ............ 716/6 |

(Continued)

OTHER PUBLICATIONS

Tian, Yuxin, et al., "Impact of photolithography and Mask Variability on Interconnect Parasitics," 10 pages.

(Continued)

*Primary Examiner* — Naum Levin
(74) *Attorney, Agent, or Firm* — Haynes and Boone, LLP (57) ABSTRACT

An integrated circuit (IC) design method includes providing an IC layout contour based on an IC design layout of an IC device and IC manufacturing data; generating an effective rectangle layout to represent the IC layout contour; and simulating the IC device using the effective rectangular layout.

18 Claims, 5 Drawing Sheets

U.S. PATENT DOCUMENTS

| | | | |
|---|---|---|---|
| 7,363,207 B2 | 4/2008 | Kamon | |
| 7,448,018 B2* | 11/2008 | Heng et al. | 716/21 |
| 7,464,364 B2* | 12/2008 | Kawachi | 716/19 |
| 7,665,048 B2* | 2/2010 | Chan et al. | 716/2 |
| 7,743,349 B2* | 6/2010 | Gupta et al. | 716/4 |
| 2004/0029299 A1 | 2/2004 | Pasadyn et al. | |
| 2004/0040001 A1 | 2/2004 | Miller et al. | |
| 2004/0093107 A1 | 5/2004 | Good et al. | |
| 2004/0181299 A1 | 9/2004 | Yamazaki et al. | |
| 2005/0007577 A1 | 1/2005 | Engelhard et al. | |
| 2005/0008227 A1 | 1/2005 | Duan et al. | |
| 2005/0021272 A1 | 1/2005 | Jenkins et al. | |
| 2005/0044514 A1 | 2/2005 | Wu et al. | |
| 2005/0112474 A1* | 5/2005 | Sandstrom | 430/5 |
| 2005/0120328 A1 | 6/2005 | Seltmann et al. | |
| 2005/0132306 A1 | 6/2005 | Smith et al. | |
| 2005/0172251 A1* | 8/2005 | Chang et al. | 716/6 |
| 2005/0188338 A1 | 8/2005 | Kroyan et al. | |
| 2005/0209820 A1 | 9/2005 | Inoue et al. | |
| 2005/0240895 A1* | 10/2005 | Smith et al. | 716/19 |
| 2005/0288812 A1 | 12/2005 | Cheng et al. | |
| 2006/0026539 A1 | 2/2006 | Tetelbaum et al. | |
| 2006/0048010 A1 | 3/2006 | Tai et al. | |
| 2006/0111804 A1 | 5/2006 | Lin | |
| 2006/0123380 A1 | 6/2006 | Ikeuchi | |
| 2006/0150132 A1* | 7/2006 | Gupta | 716/5 |
| 2006/0190876 A1 | 8/2006 | Yamada | |
| 2006/0206851 A1* | 9/2006 | Van Wingerden et al. | 716/19 |
| 2006/0282189 A1 | 12/2006 | Akisawa et al. | |
| 2007/0013695 A1* | 1/2007 | Chmelar | 345/420 |
| 2007/0055892 A1 | 3/2007 | Pikus | |
| 2007/0101305 A1 | 5/2007 | Smith et al. | |
| 2007/0201442 A1 | 8/2007 | Hekmatpour et al. | |
| 2007/0234246 A1 | 10/2007 | Sinha et al. | |
| 2007/0265725 A1 | 11/2007 | Liu et al. | |
| 2007/0266356 A1 | 11/2007 | Chang et al. | |
| 2007/0266362 A1 | 11/2007 | Lai et al. | |
| 2007/0277134 A1 | 11/2007 | Zhang et al. | |
| 2007/0288219 A1 | 12/2007 | Zafar et al. | |
| 2009/0009741 A1* | 1/2009 | Okita et al. | 355/53 |
| 2009/0070725 A1 | 3/2009 | Yamada | |
| 2009/0199151 A1 | 8/2009 | Banerjee et al. | |

OTHER PUBLICATIONS

Zhou, Ying, et al., "A New Methodology for Interconnect Parasitics Extraction Considering Photo-Lithography Effects," 6 pages.

U.S. Appl. No. 12/025,933, filed Feb. 5, 2008 by Francis Ko, Chih-Wei Lai, Kewei Zuo, Henry Lo, Jean Wang, Ping-hsu Chen, Chun-Hsien Lin, and Chen-Hua yu for "Novel Methodology to Realize Automatic Virtual metrology," 23 pages.

Cheng, Y.C., et al., "Patterning Effect and Correlated Electrical Model of Post-OPC MOSFET Devices," Proceeding of SPIE vol. 6521 65210G-1 to 65210G-9, 9 pages.

Ottesen, Craig, "Front Opening Pod (FOUP) Fire Protection: A General Overview," International Sematech, Nov. 5, 1999, 10 pages.

Chen, Kuah-Chou, et al., "Integrated Circuits Industry/Front-Opening Unified Pod Auto-Loading Structure," Knowledge Bridge, No. 22, Apr. 2002, 4 pages.

Chappell, Jeff, "The Future is the FOUP—company Business and Marking," Electronic News, Jul. 17, 2000, 2 pages.

Ouyang, Charles, et al., "An Analytical Model of Multiple ILD thickness Variation induced by Interaction of Layout Pattern and CMP Process," IEEE Transactions on Semiconductor Manufacturing, Aug. 2000, 7 pages.

Raghvendra, Srinivas, et al., "DFM: Linking Design and Manufacturing," Proceedings of the 18th International conference on VLSI Design held jointly with 4th International Conference on Embedded Systems Design, VLSID, 2005, 4 pages.

Tsuijikawa, Hiroyuki, et al., "Power=Supply Noise Reduction with Design for Manufacturability," IEICE Trans Fundamentals, vol. E88-A, No. 12, Dec. 2005, 8 pages.

Yue, H. H., et al., "Fault Detection of Plasma Etchers using Optical Emission Spectra," Aug. 2000, IEEE Transactions on Semiconductor Manufacturing, vol. 13, Issue 3, 12 pages.

Huang, Yi-Ting, et al., "Importance of Data Quality in Virtual metrology," IEEE Industrial Electronics, IECON 2006, 32nd Annual Conference, Nov. 6-10, 2006, 6 pages.

Chang, Yaw-Jen, et al., "Virtual Metrology Technique for Semiconductor Manufacturing," Neural Networks, 2006, IJCNN '06, International Joint conference Jul. 16-21, 2006, 5 pages.

Lin, Tung-Ho, et al., "A Virtual Metrology Scheme for Predicting CVD Thickness in Semiconductor Manufacturing," Robotics and Automation, ICRA Proceedings 2006, IEEE International Conference May 15-19, 2006, 6 pages.

Chappell, Jeff, "The Future is the FOUP—Company Business and Marketing", Electronic News, Jul. 17, 2000, 2 pages.

Chen, Kuan-Chou, et al., "Integrated Circuits Industry / Front-Opening Unified Pod Audo-Loading Structure," Knowledge Bridge, No. 22, Apr. 2002, 4 pages.

Cheng, Y.C., et al., "Patterning Effect and Correlated Electrical Model of Post-OPC MOSFET Devices," Proc. of SPIE vol. 6521 65210G-1 to 65210G-9 (9 pages).

U.S. Appl. No. 12/025,933, filed Feb. 5, 2008 by Francis Ko, Chih-Wei Lai, Kewei Zuo, Henry Lo, Jean Wang, Ping-Hsu Chen, Chun-Hsien Lin, and Chen-Hua Yu for "Novel Methodology to Realize Automatic Virtual Metrology", 23 pages of text, 7 pages of drawings.

Ottesen, Craig, "Front Opening Pod (FOUP) Fire Protection: A General Overview," International Sematech Nov. 5, 1999, 10 pages.

* cited by examiner

METHOD FOR SHAPE AND TIMING EQUIVALENT DIMENSION EXTRACTION

CROSS-REFERENCE

This application claims the benefit of U.S. Provisional Application 61/032,358 entitled "A METHOD FOR SHAPE AND TIMING EQUIVALENT DIMENSION EXTRACTION," filed Feb. 28, 2008, herein incorporated by reference in its entirety.

The present disclosure is related to the following commonly-assigned U.S. patent applications, the entire disclosures of which are incorporated herein by reference: U.S. application Ser. No. 12/025,933 filed Feb. 5, 2008 by inventors Francis Ko et al. for "Automatic Virtual Metrology for Semiconductor Wafer Result Prediction"; and U.S. application Ser. No. 11/748,604 filed May 15, 2007 by inventors Ru-Gun Liu et al. for "MODEL IMPORT FOR ELECTRONIC DESIGN AUTOMATION".

BACKGROUND

Semiconductor technologies are continually progressing to smaller feature sizes, such as 65 nanometers, 45 nanometers, and below. Integrated circuits (IC) design and fabrication technologies have been exploited to a limit and need more tuning in designing and also interactions between designing and manufacturing.

Accurate simulation of today's devices needs to account for real device geometry complexities after the lithography and etching processes, especially when the channel length shrinks to 65-nm and below. The device performance is believed to be quite different from what designers expect in the conventional IC design flow. The traditional design lacks consideration of the photolithography effects and pattern geometrical operations from the manufacturing side.

For the deep sub-micron circuit design, a purely rectangular shape is almost impossible to achieve in manufacturing. A potential risk is hence imposed on the linkage between design and manufacturing. However, there is no additional parameter in the current SPICE model card to describe the effect of shape distortions. For example, the corner rounding of the L-shape Active region near the poly-silicon gate will be different from that of the T-shaped Active region. The same issue arises in poly-silicon with a hammerhead near the gate area. Several works have attempted to model or characterize non-rectangular devices by slicing a transistor into small parallel devices, and then summing up the currents contributed from those small sliced transistors. This old approach is intuitive but lacks proper models to accurately describe the narrow width and short channel effects of sliced devices. In addition, the sliced devices might fall into the sub-ground region with dimensions less than the minimum of the binning boundary of the SPICE model.

In current digital IC design flow, there are several commercial tools utilized to do the physical checking of devices, such as the well-known DRC rules or further advanced DFM lithography hotspot check rules. Designers have to modify the layout once the layout violates the physical design rules. However, all the methods mentioned are rule-based approaches. There are no tools that can provide a real time electrical performance check for designers. Another disadvantage of the current approaches is that they cannot deal with complicated circuit layout environments. Moreover, there is a limitation on the grid resolution of the database libraries for current rule-based approaches.

BRIEF DESCRIPTION OF THE DRAWINGS

Aspects of the present disclosure are best understood from the following detailed description when read in association with the accompanying figures. It is noted that, in accordance with the standard practice in the industry, various features in the drawings are not drawn to scale. In fact, the dimensions of illustrated features may be arbitrarily increased or decreased for clarity of discussion.

DETAILED DESCRIPTION

It is understood that the following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Design for manufacturability (DFM) is an integration of manufacturing data and design procedure for better yield and design efficiency. An interaction and communication between designer and manufacturer is enhanced thereby for more accurate, faster, and more efficient design. In one example, various manufacturing data are formulated, quantified, and integrated to enable collaboration between manufacturer and designer, reduce design time and design cost, and increase manufacturing yield and production performance.

Figure 1:
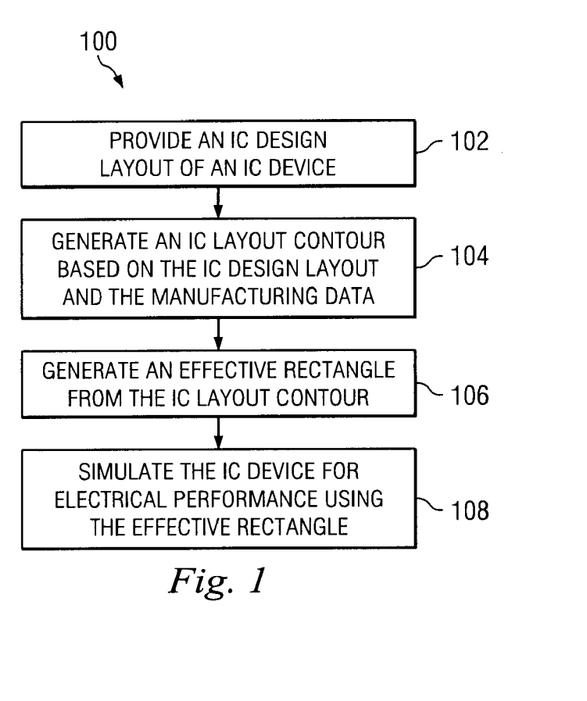
FIG. 1 is a flowchart of an integrated circuit (IC) design method in one embodiment constructed according to aspects of the present disclosure.
Figure 3:
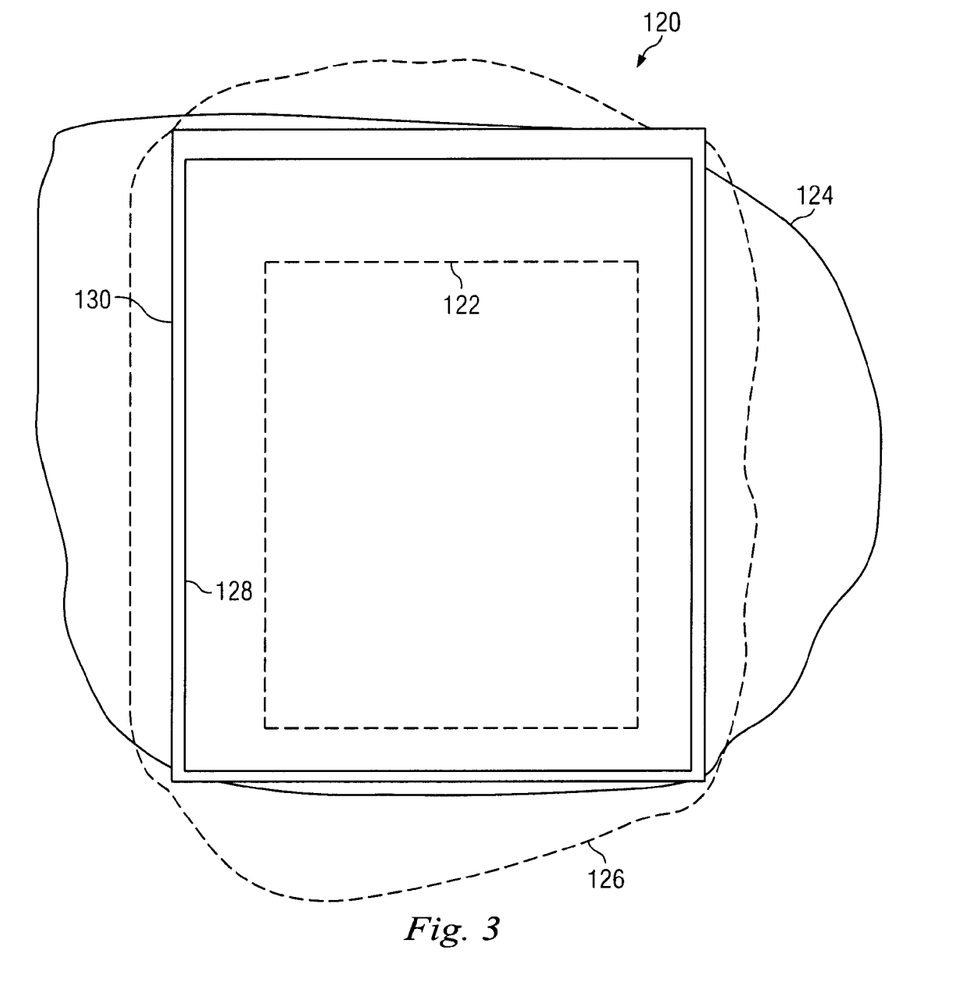
FIG. 3 is a top view of an exemplary IC device constructed according to aspects of the present disclosure.

FIG. 1 is a flowchart of an IC design flow or design method 100. FIG. 3 is a top view of an exemplary IC device constructed according to aspects of the present disclosure. In order to obtain more accurate prediction on circuits, the disclosed method in various embodiments provides an efficient approach to estimate nonrectangular metal-oxide-semiconductor field-effective-transistor (MOSFET) devices. In addition, the method also provides an electrical hotspot criterion to investigate and verify the manufacturability of devices during patterning processes. In one embodiment, the electrical rule criterion will be performed after the regular Design Rule Check (DRC) or Design for Manufacturing rule check. Photolithography and industrial-strength SPICE model are taken into consideration to further correlate the process variation. Referring to FIGS. 1 and 3, the method 100 is described below.

The IC design method 100 may begin at step 102 by providing an IC design layout of an IC device. The IC device is taken as an example for simplicity to illustrate the design method. In one example, the IC device includes a MOSFET device. An exemplary IC device 120 and its layout in various perspectives is illustrated in FIG. 3. In this example, the IC device 120 includes a channel region with a designed layout 122. The IC device may also include other features such as source, drain and contact (not shown). In step 102, providing the IC design layout may further include adding other assistant features, such as dummy features and/or optical proximity correction (OPC) features, to the IC design layout.

The IC design method 100 proceeds to step 104 by generating an IC layout contour based on the IC design layout 122 and other design data, such as a gate electrode and an active region. The generating of an IC layout contour is a process to simulate the IC device to generate its physical dimensions and geometries based on its design layout. In another embodiment, the generating process further utilizes the manufacturing data associated with an IC manufacturer to be implemented to fabricate the IC device. In one embodiment, the manufacturing data includes lithography processing data, such as statistical data of focus and/or energy (or dose) and masks associated with lithography exposure, to transfer an IC design layout (such as a channel region 122) defined in the mask to an IC feature on a wafer. In another embodiment, the manufacturing data also includes other relevant processing data, such as etching data including etchant characteristics. The simulation will generate virtual fabricated features corresponding to the IC design layout. In this example of FIG. 3, the real channel region is defined by the gate electrode region and the active region. If the simulation generates active region contour 124 and gate electrode contour 126 as illustrated in FIG. 3, the overlay area of the active region contour 124 and the gate electrode contour 126 defines the channel contour.

The IC design method 100 proceeds to step 106 by generating an effective rectangle from the IC layout contour. The effective rectangle is a geometry that can be simulated easily and more efficiently. The generating of the effective rectangle is explained in more detail with the IC device 120 as an example. First, find a maximum rectangle 128 inside the IC layout contour defined by the gate electrode contour 126 and the active region contour 124. This step can be implemented automatically using a geometrical calculation algorithm. Then, find a width correction to the maximum rectangle according to the difference between the channel contour and the maximum rectangle 128. For example, find an average difference between the channel contour and the maximum rectangle 128 among all the points of both sides of the maximum rectangle 128 along the length direction. Similarly, find a length correction to the maximum rectangle according to the difference between the channel contour and the maximum rectangle 128. For example, find an average difference between the channel contour and the maximum rectangle 128 among all the points of the both sides of the maximum rectangle 128 along the width direction. In one embodiment, the effective rectangle 130 is a rectangle with a width equal to the width of the maximum rectangle plus the width correction and a length equal to the length of the maximum rectangle plus the length correction.

The IC design method 100 proceeds to step 108 by simulating the IC device for its electrical performance based on the effective rectangle 130. The simulation can be performed by a suitable simulation tool such as the simulated program with integrated circuit emphasis (SPICE). SPICE is a tool to provide complete physical simulation including output signal deformation, signal level, and time delay. SPICE is a circuit-analysis program developed by UC Berkeley. The simulated results may include various electrical parameters, such as saturation current. In another embodiment, the simulated results include other electrical performance, such as short channel effect and the associated performance deviation. In a further embodiment, the step 108 further includes various verification and inspection to identify hotspots that may cause quality issues and/or reliability issues to the IC device. In one example, various criteria are defined to check the simulated electrical parameters and to find from the simulated results if any area is out of the tolerable ranges according to the predefined criteria.

Figure 2:
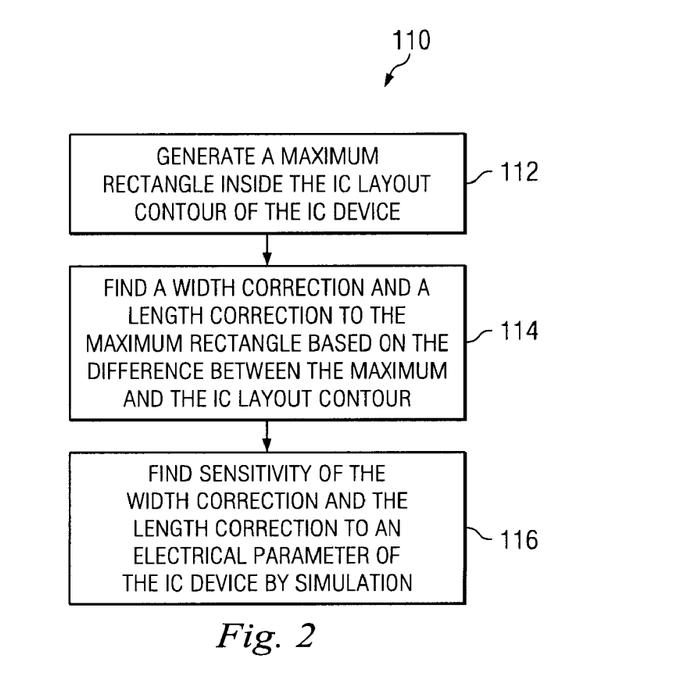
FIG. 2 is a flowchart of an integrated circuit (IC) design method in another embodiment constructed according to aspects of the present disclosure.

FIG. 2 is a flowchart of another embodiment of an IC design flow or design method 110. Referring to FIGS. 2 and 3, the method 110 is described below. The method 110 can be a part of the method 100 in another embodiment. The IC design method 110 may begin by providing an IC design layout of an IC device and further generating an IC layout contour based on the IC design layout 122 and other design data, such as a gate electrode and an active region. The generating of an IC layout contour is a process to simulate the IC device to generate its physical dimensions and geometries based on its design layout. In one embodiment, the generating process further includes utilizing the manufacturing data associated with an IC manufacturer to be used for fabricating the IC device. In this example, the IC design layout includes a channel region of a MOS transistor.

The IC design method 110 may proceed to step 112 by generating a maximum rectangle 128 inside the IC layout contour defined by the gate electrode contour 126 and the active region contour 124. This can be implemented automatically using a geometrical calculation algorithm.

The IC design method 110 proceeds to step 114 by finding a width correction and a length correction to the maximum rectangle according to the difference between the channel contour and the maximum rectangle 128. For example, take an average width difference between the channel contour and the maximum rectangle 128 among all the points of both sides of the maximum rectangle 128 along the length direction as a width correction. Similarly, take an average length difference between the channel contour and the maximum rectangle 128 among all the points of both sides of the maximum rectangle 128 along the width direction as the length correction. In one embodiment, an effective rectangle 130 is defined as a rectangle with a width equal to the width of the maximum rectangle plus the width correction and a length equal to the length of the maximum rectangle plus the length correction. The effective rectangle is used as the channel region for simulation to extract electrical performance parameters and other relevant data. The simulation can be performed by a relevant simulation tool such as SPICE. The simulated results may include various electrical parameters such as saturation current. In another embodiment, the simulated results include other electrical performance characteristics, such as short channel effect and the associated performance deviation.

The IC design method 110 proceeds to step 116 by extracting the sensitivities of the width correction and the length correction to an electrical parameter of the IC device from the simulation results using the effective rectangle 130 as the channel region. Take the saturation current Ids as an example. The maximum rectangle can be used as the channel region and is simulated for its saturation current $Ids_{max\_in\_con}$. The saturation current Ids can be found by either a simulation to the channel contour, a simulation to the effective rectangle, or experimental results from the experiments in various embodiments. The comparison between the Ids and $Ids_{max\_in\_con}$ can provide the length sensitivity $L_{gravity}$ and the width sensitivity $W_{gravity}$ to the corresponding length correction $\delta L$ and the width correction $\delta W$ such that the saturation current can be expressed as below $$Ids = Ids_{max\_in\_con} + (L_{gravity} \times \delta L + W_{gravity} \times \delta W)$$

In one embodiment, the above simulated results can be accumulated to build a design data library such that the data library can be used as a table for future design simulation. When a new IC design layout is in consideration, the IC layout contour is generated from the IC design layout. The maximum rectangle is generated accordingly. When the maximum rectangle matches one of IC layout in the data library, the relevant sensitivities can be used for electrical performance evaluation based on the above equation or the like.

In other embodiments, the design method 100 or the method 110 may proceed to tape-out. After all the verifications of the design functional specification, signal timing, device connectivity, and design rule of layout are accomplished, the layout will be taped out and be provided to a manufacturer, such as a semiconductor foundry for mask fabrication and IC chip fabrication.

Figure 4:
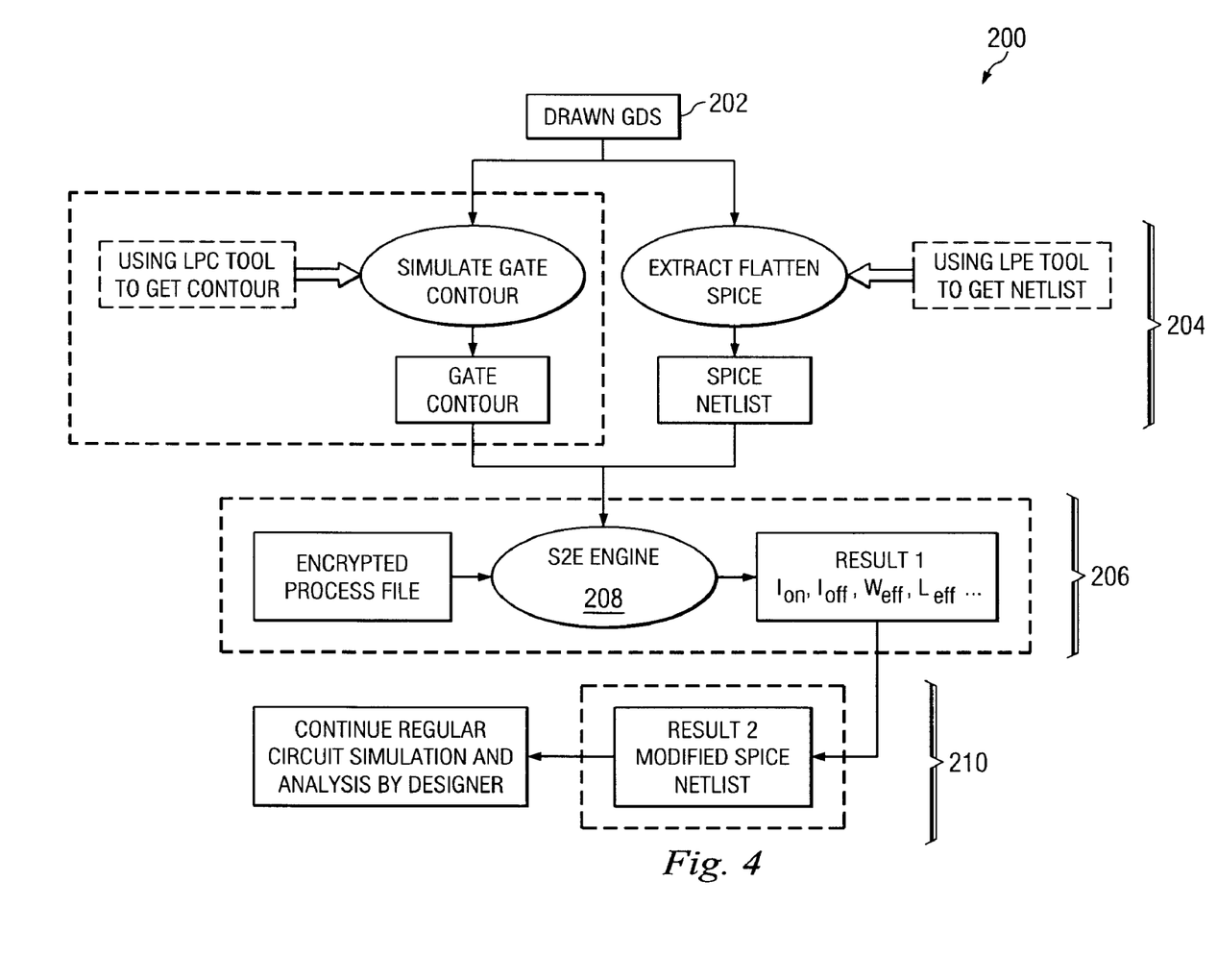
FIG. 4 is a block diagram illustrating an IC design method in one embodiment constructed according to aspects of the present disclosure.

FIG. 4 is a block diagram 200 collectively illustrating an IC design method and an IC design system to implement the IC design method. The design method begins from design data 202 (such as drawn gds). The design data may be provided by front design steps, such as RTL/synthesis and place & route. The design method then proceeds to the next step 204 for virtual physical simulation. For example, using an LPC tool to generate an IC layout contour, such as a gate contour, an active region contour, or a channel contour. In another example, a layout parasitic extraction (LPE) tool is implemented for extracting more accurate parasitic parameters, such as parasitic resistance and capacitance, with the manufacturing data such as CMP data and/or etch data. Then the extracted parasitic parameters are provided to the SPICE netlist for further simulation. The netlist is a representation of a design as a set of library cells and their interconnections. In one example, the netlist is a text file or set of text files.

The design flow then proceeds to step 206. The physical parameters, dimensions, and/or geometries such as layout contours simulated from the above step can be fed to the shape-to-electric (S2E) engine 208 to simulate electrical performance of the IC device based on the IC layout contours according to the method 100 and/or the method 110. The S2E engine is designed operable to implement the method 110 in one embodiment. In another embodiment, the S2E engine transforms the irregular channel region into a shape of a rectangle with equivalent length and width for each MOS device. Consequently, each transistor can be easily identified and simulated. Hence the electric parameters are extracted from the simulated results efficiently. During the step 206 of simulating for the electric parameters from the geometric parameters of the IC device, the simulation process files may be encrypted and provided to the S2E engine for shape to electric simulation. Then electric parameters, such as on-current ($I_{on}$), off-current ($I_{off}$), effective width ($W_{eff}$), effective length ($L_{eff}$) and other parameters, are extracted from the simulation result.

At the next step 210, the extracted electric parameters from the S2E engine are provided to the SPICE model and the SPICE netlist is modified accordingly for further circuit simulation and analysis by designer to tune the design layout of the IC device. The above process flow may be repeated for fine tuning the IC device design.

In various embodiments, the above disclosed method can be incorporated into a normal IC design flow in one embodiment. Therefore, the normal IC design can resume from the simulated results from the S2E engine. The disclosed design method provides an aggressive approach to extract the equivalent length and width for non-rectangular transistors and is proposed and demonstrated on the 65-nm and 45-nm nodes. This approach is easy to apply to the regular circuit design flow without significant modifications. The new model prior to the device inspection can be saved. In addition, it can turn the non-ideal channel region, induced by manufacturing limitations and unfriendly design types, into a set of representative information. Based on this method, we have developed a packaged tool kit, called the Shape-to-Electrical engine (S2E), for designers to simulate the exact design performance.

Figure 5:
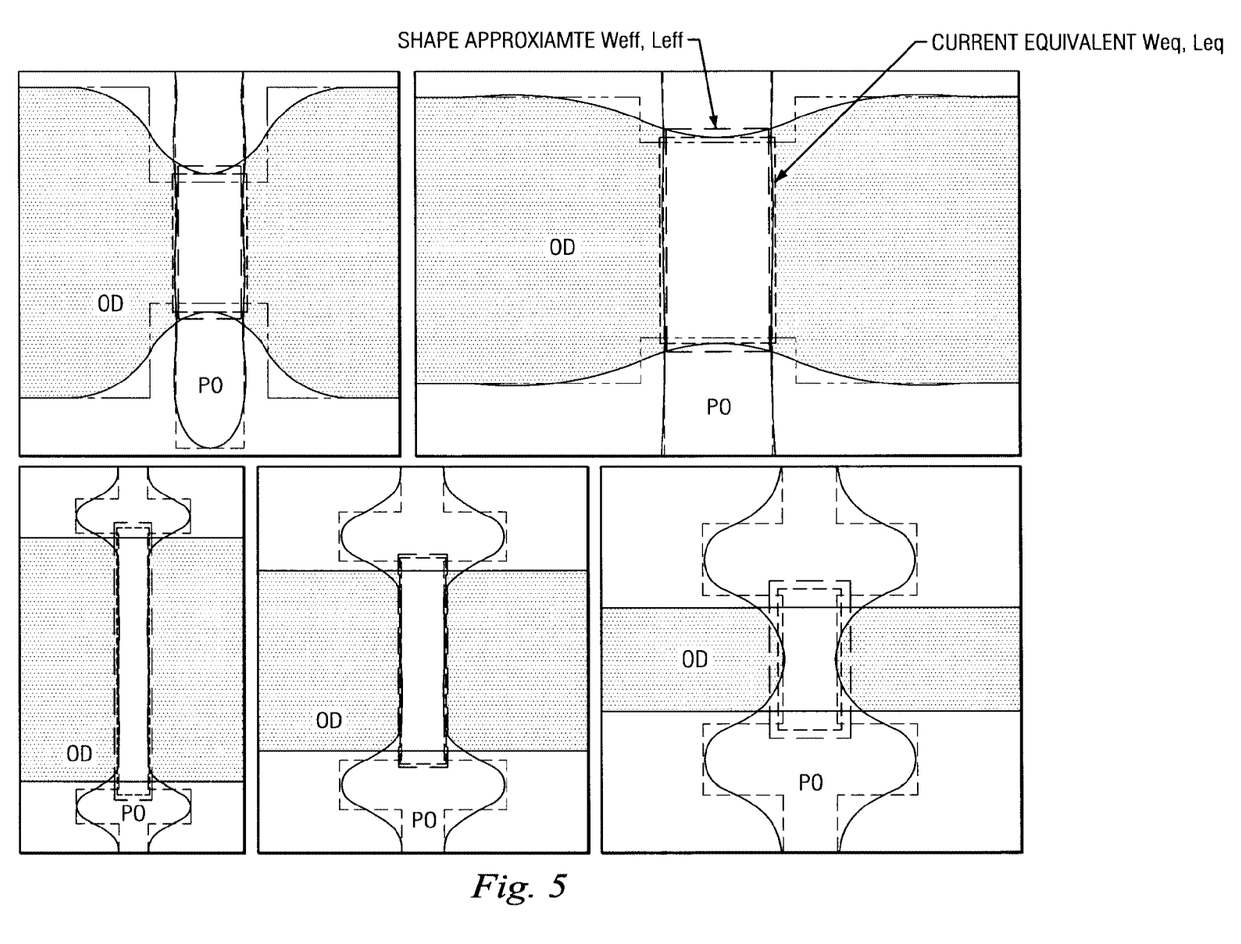
FIG. 5 shows various examples of a sketch of post-optical-proximity-proximity (OPC) contour of a metal-oxide-semiconductor field-effect-transistor (MOSFET) device through contour simulation according to aspects of the present disclosure.

The disclosure provides the method for IC designing and simulation in another embodiment. When simulating and designing an IC device, such as a transistor, a feature of the IC device, such as a gate region, is usually distorted and has an irregular shape. FIG. 5 shows various examples of a sketch of post-OPC contour of a MOSFET device through contour simulation. Instead of slicing the feature, the disclosed approach considers the whole region of the gate contour and translates the irregular shape to a regular one with an equivalent gate length and width. After such treatment, the driving current and leakage power of this rounded device can be estimated effectively. Thus, there is no concern of the binning boundary or other physical issues for the SPICE model as well as the mathematical modeling. The $\delta L_{eff}$ and $\delta W_{eff}$ represent the differences between distorted and designed gate shapes in the length and width, respectively. Then, the optimized $\delta L_{eff}$ and $\delta W_{eff}$ can be estimated by introducing the sensitivity of the geometry corresponding to electrics, or vice versa. Moreover, it is important to refer to the same binning region for the drain current prediction. Equations (1) and (2) show the simplified expressions for the extraction, $$(R_{patterning}+1)^{C_{g1}} = C_{g2} + C_{g3} \cdot \left(1+\frac{\delta L_{eff}}{L}\right) \cdot \left(1+\frac{\delta W_{eff}}{W}\right), \quad (1)$$

$$dI^*_{sat} = C_{f1} \cdot [\eta_{W',L'} \cdot \delta L_{eff} + \delta W_{eff}] + \frac{\delta L_{eff} \cdot \delta W_{eff}}{C_{f1}} \cdot \left(\frac{1}{L'} + \frac{\eta_{W',L'}}{W'}\right)^{C_{f3}}, \quad (2)$$

where the $C_{g1}, C_{g2}, C_{g3}, C_{f1}, C_{f2}, C_{f3}$ are the relevant tuning factors. The parameter $\eta$ is a weighting factor, and the L, W and the L', W' are sets of the device dimensions drawn and extracted, respectively. The parameter $R_{patterning}$ indicates the index of the distorted channel region, and $dI^*_{sat}$ is the difference of the normalized driving current for electrics.

These two equations can be expressed as a simple transmission matrix for the geometry and electrics in Equation (3), $$\begin{bmatrix} \delta L_{\mathit{eff}} \\ \delta W_{\mathit{eff}} \end{bmatrix} = A_{\mathit{Electrics}} \cdot \begin{bmatrix} G_L^{-1} \\ G_W^{-1} \end{bmatrix} + B_{\mathit{Geometry}} \cdot \begin{bmatrix} -\eta \\ 1 \end{bmatrix}, \quad (3)$$

where the $G_L$ and $G_W$ are the sensitivity functions, and $A_{Electrics}$ and $B_{Geometry}$ are the matrices of the electrical part and the geometrical part, respectively.

The operation for S2E is simple and fully compatible to the current IC design flow. As illustrated in FIG. 4 as a brief operation flow to implement the S2E engine, this flow is the same as the regular one except for the interfaces prior and posterior to the S2E operation. The input of this operation is a distorted contour pattern and its outputs are tables of device parameters and a modified netlist, which will be returned to the regular flow for follow-up post simulation.

Several tests have been performed to evaluate the compatibility with EDA tools. In various examples, the accuracy of the results is verified with the experimental data from the 65-nm to 55-nm technology nodes. The first investigation is CD variation (CDV) check based on the conditions with Focus-Exposure-Matrix (FEM) splits. The second one is to perform the full chip verification for those transistors with potential electrical hotspots. In these two exemplary investigations, several hotspots were identified and classified.

Figure 6:
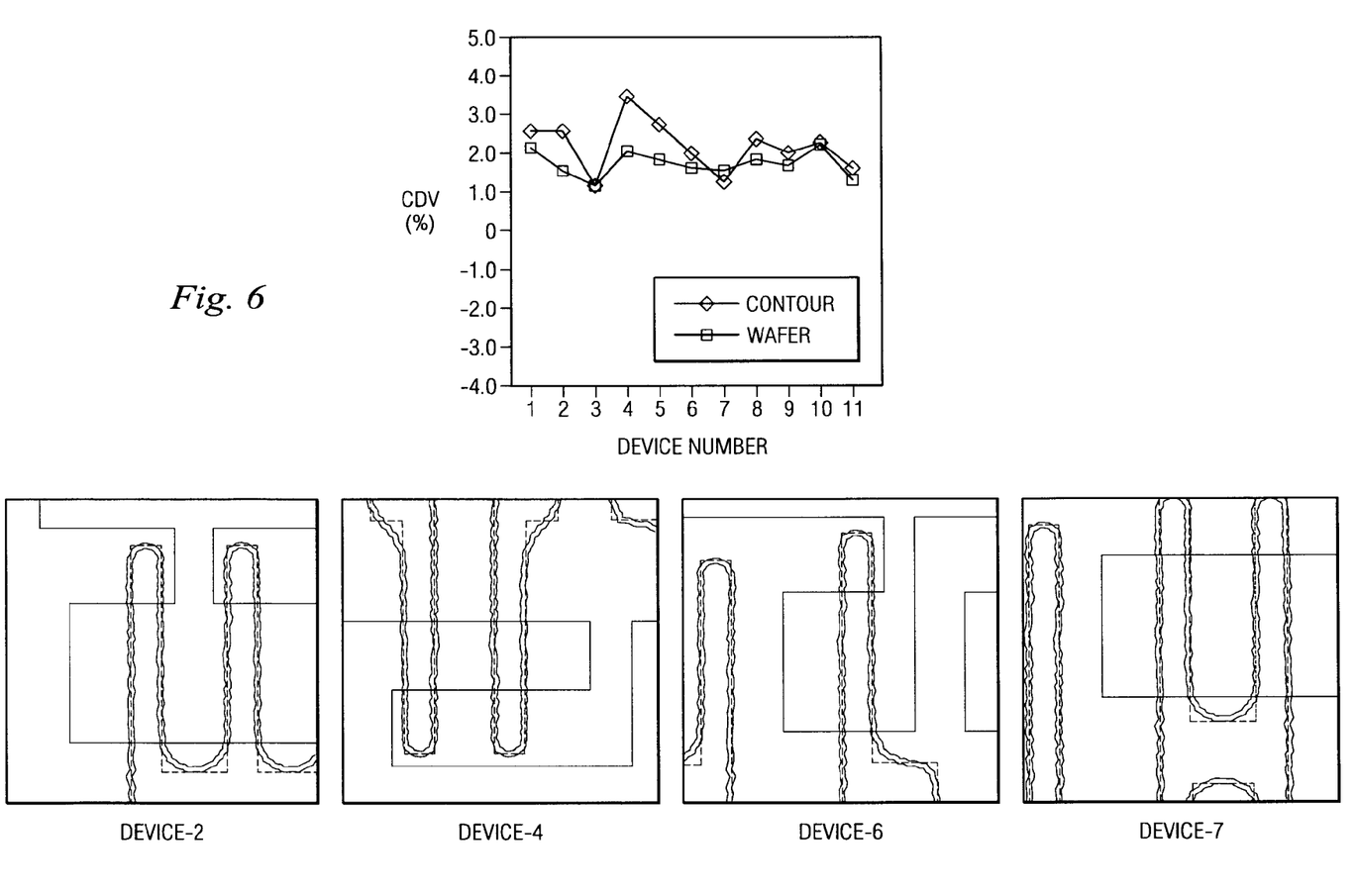
FIG. 6 shows the results of critical dimension variation (CDV) and the scanning electron microscope (SEM) image of integrated circuit devices in various examples according to aspects of the present disclosure.

The CDV check reveals the possibility to investigate the gate CD variations after contour simulation by the S2E engine. The CDV results can be used to check whether the design meets the designer's expectations. The CDV check plays an important role in DFM because it is a direct indication of the CD variation sensitivity of the design. Meanwhile, the S2E engine is capable of verifying the gate CD of the full chip efficiently. FIG. 6 shows the results of CDV and the SEM image of the devices used in these experiments. According to the comparison between simulation contours and SEM images in these examples, the S2E engine can be utilized to inspect the influence of the shape distortion since the CDV differences are smaller than 1.5%.

The verification with S2E engine on a 65-nm actual circuit has been demonstrated in another example. The primary work is to identify the risky design patterns and its impact on the electrical performance caused by corner rounding. In this example, several transistors have been identified and indicated for the severity of the impact on electrical performances. For example, a small device with serious Active and Poly rounding is identified. Consequently, the S2E engine facilitates not only the CDV qualification but also the investigation of corner rounding.

The S2E engine can derive the driving current of a non-ideal device from its shape to inspect whether the behaviors of the device are acceptable. The electrical data from devices with various shapes can be identified and correlated beforehand. The data contains the information of designing and manufacturing, including the design size, the pattern style, the optical proximity effect, the etching bias, CMP polishing compensation, and so forth. Therefore, it is necessary to correlate the overall behavior of dimension changes to electrical performance. The correlation can be implemented in the S2E engine to predict the electrical performance of devices. The multiple regression method and a quadratic model are adopted and calibrated with silicon data. Equations (4) to (6) are for the regression are provided below. The data for modeling is acquired either from a SPICE model or from the measurement. The main concept for data modeling is to correlate after-development inspection (ADI) and etching-bias first. The next step is to build a global model with an implicit function of etching-bias and all other parameters.

For characterizing the initial data, a multi-variable regression method is used for silicon data calibration, resulting in Equation (4). The drain current can be expressed as the following:

$$I_{sat} = \frac{C_0 \cdot GateLength_{drawn}^{C_L}}{Pitch^{C_P} \cdot GateWidth_{drawn}^{C_W} \cdot CD_{ADI}^{C_{ADI}}}, \quad (4)$$

where $CD_{ADI}$ is the measured CD after photoresist development, and Cs ($C_0$, $C_L$, $C_P$, $C_W$ and $C_{ADI}$) are constants according to the fitting result. The relation of lithographic pitch effect versus $I_{sat}$ can be sketched as a 3D plot.

Alternatively the data calibration can be carried out with a two-step model, as shown in Equation (5):

$$I_{sat,n} = \mathit{offset}_1 + \sum_{i,j,k=const.} c_i \cdot X_n \cdot \left(1 + \frac{c_k}{c_j} X_n\right)^2, \quad (5)$$

where $X_n$ can be length, width, ADI, after-etching inspection (AEI) bias, and some relative parameters. After some algebraic steps, Equation (5) can be cast into a matrix form for programming in practice.

$$I_{sat,n} = \mathit{offset} + \begin{bmatrix} a1 & a2 \\ b1 & b2 \\ c1 & c2 \\ d1 & d2 \end{bmatrix} \cdot \begin{bmatrix} L & L^2 \\ W & W^2 \\ ADI & ADI^2 \\ AEIbias & AEIbias^2 \end{bmatrix}$$

$$= \mathit{offset} + [\mathit{coeff.}] \cdot [\mathit{parameters}]$$

Finally, the normalized $I_{sat,n}$ can be transformed back to the physical domain:

$$I_{sat} = (\mathit{offset}_2 + C^* \times I_{sat,n})^{2.018}. \quad (6)$$

In one example, the model accuracy for silicon calibration is within 5%. Both approaches are adopted for silicon data calibration in this study in either formulating the process libraries or building the lookup tables.

Since the gate CD would be varied due to the drifts of the exposure and focus in the lithography process, the electrical modeling and the characterization of devices are correlated to the process window and its statistical result are concerned. With the splits of process window, the S2E engine can generate a set of corner results including shape and electrical information. The variation range of each electrical parameter corresponding to the process skews can be estimated. A unified statistical expression is proposed to describe the systematic relationship between the process drift and electrical property of the devices. Once the focus-exposure condition is specified, the shift of electrical properties is predictable by Equations (7) and (8):

$$CD_{gate,i,j,k} = \mathit{offset}_{nom} + [S_{CD,thres}]_{i,j} \times U_{thres} + \omega \cdot [S_{CD,defocus}]_{i,j} \times U_{defocus}, \text{ and} \quad (7)$$

$$(Variance)_{i,j,k} = [S_{var,thres}]_{i,j} \times U_{thres} + \omega \cdot [S_{var,defocus}]_{i,j} \times U_{defocus}. \quad (8)$$

The result of gate CD distribution versus process window is expressed by Equation (9):

$$CD_{gate,final} = (CD_{gate,i,j,k}) + (Variance_{i,j,k}). \quad (9)$$

Similarly, electrical parameters can be summarized as Equations (10) to (12).

$$(Y)_{elec,i,j,k} = \text{offset}_{typical} + [S_{Y,thres}]_{i,j} \times U_{thres} + \omega \cdot [S_{Y,defocus}]_{i,j} \times U_{defocus}, \quad (10)$$

$$(\text{Variance})_{i,j,k} = [S_{var,thres}]_{i,j} \times U_{thres} + \omega \cdot [S_{var,defocus}]_{i,j} \times U_{defocus}, \text{ and} \quad (11)$$

$$Y_{elec,final} = (Y_{elec,i,j,k}) + (\text{Variance}_{i,j,k}) \quad (12)$$

where Y indicates one of the electrical parameters, $\omega$ is the weighting factor, k means the $k^{th}$ transistor, and i, j indicate the exposure and defocus conditions.

In various embodiments, the disclosed method provides an approach to extract the equivalent dimension for non-rectangular transistors. The S2E engine is developed to characterize the distorted channel region caused by the resolution limit and manufacturing processes. This tool can be incorporated into the existing circuit design flows with slight modifications. The S2E engine can packaged as a tool-kit for effective dimension extraction, CDV inspections, and statistical analysis from shapes to electrics, and eventually the parasitic component extractions for IC design with serious pattern distortion.

The disclosed design methods may have various embodiments, variations, and extensions. For example, the method may be performed in different order, certain loop, and different combinations of various design steps. When the stacking effect is considered, all underlying layers are related to CMP simulation and RC extraction of an overlying layer. The IC design method can be properly modified for optimized performance in dealing with the stacking effect.

The disclosed design method includes two level simulations. The first level simulation is based on the IC design layout to generate physical parameters, dimensions, and geometry, such as the gate electrode contour, the active region contour, and/or the channel contour. The first level simulation may implement an existing physical design tool. For example, the channel contour may be generated from SPICE. Another tool is ASTAP developed by IBM (commercially available versions are typified as HSPIC). SPICE may be used to simulate and generate other geometrical dimensions, which are not sensitive to CMP processes. In one example, SPICE may generate a trench width. In another example, SPICE is used to generate all geometrical dimensions in parallel. In another embodiment, the first level simulation includes a manufacturing simulation, such as a lithography process check (LPC). In LPC simulation, a lithography process is simulated for an IC layout contour. Various failure areas, defect areas, or weak areas associated with the manufacturing process, referred to as hotspots, can be identified for further design tuning.

The second level simulation includes simulating the electrical performance of the IC device based on the IC layout contour. The second level simulation may further include extracting electrical parameters. In one embodiment, the second level simulation includes identifying IC layout hotspots based on predefined criteria. In another embodiment, the second simulation includes building a data library such that the data library can be used as a table for future design simulation. When a new IC design layout is in consideration, the IC layout contour is generated from the IC design layout. The effective rectangle is generated accordingly. The simulation results are saved for the corresponding effective rectangle (such as an effective channel). When the effective channel rectangle of a new IC device matches one of the channel layout in the data library, the saved simulated results can be directly applied to the new IC device for design verification, evaluation, inspection, and/or hotspot identification. The second level simulation utilizes the effective rectangle for the IC layout contour. The second level simulation may further include generating maximum rectangle, the length/width correction, and/or length/width sensitivity.

The disclosed method 100 and/or 110 can be implemented in an environment including a computer system having a microprocessor, an input device, a storage device, a display, and a communication device all interconnected by one or more buses. The storage device could be a floppy drive, hard drive, CD-ROM, optical drive, flash memory, or any other form of storage device. The communication device could be a modem, network card, or any other device to enable the computer system to communicate with other nodes. It is understood that any computer system could represent a plurality of interconnected (whether by intranet or Internet) computer systems, including without limitation, personal computers, mainframes, personal digital assistants (PDAs), and cell phones.

A computer system typically includes at least a hardware capable of executing machine readable instructions, as well as the software for executing acts (typically machine-readable instructions) that produce a desired result. In addition, a computer system may include hybrids of hardware and software, as well as computer sub-systems. Combinations of software and hardware could also be used for providing enhanced functionality and performance for certain embodiments of the present disclosure. One example is to directly build software functions into a silicon chip. The system may be designed to work on any specific architecture. For example, the system may be executed on a single computer, local area networks, client-server networks, wide area networks, internets, hand-held, and other portable and wireless devices and networks.

Thus, the present disclosure provides an integrated circuit (IC) designing method. The method includes an integrated circuit (IC) design method comprising providing an IC layout contour based on an IC design layout of an IC device and IC manufacturing data; generating an effective rectangle layout to represent the IC layout contour; and simulating the IC device using the effective rectangular layout.

In one embodiment of the disclosed method, the providing of the IC layout contour includes providing the manufacturing data associated with an IC manufacturing to be implemented to fabricate the IC device; providing the IC design layout of the IC device; and generating the IC layout contour based on the IC design layout and the IC manufacturing data by simulation. The providing of the IC design layout may include adding optical proximity correction (OPC) features to the IC design layout. The generating of the IC layout contour may include providing lithography data associated with a lithography system of the IC manufacturing. The providing of the lithography data may include providing statistical focus data associated with lithography exposure focus of the lithography system; providing statistical energy data associated with lithography exposure dose of the lithography system; and providing statistical mask data of a mask pattern having the IC design layout. In one embodiment, the IC layout contour is associated with a channel region of a metal-oxide-semiconductor field-effect transistor (MOSFET). The IC layout contour includes an overlap region of a gate contour and an active region contour. In another embodiment, the generating of the effective rectangle includes generating a maximum rectangle inside the IC layout contour, wherein the maximum rectangle defines a width and a length; finding a width correction to the maximum rectangle according to dimensional difference between the maximum rectangle and the IC layout contour in a width direction; and finding a length correction to the maximum rectangle according to difference between the maximum rectangle and the IC layout contour in a length direction. The simulating of the IC device may include finding a width sensitivity of the width correction to an electrical parameter of the IC device; and finding a length sensitivity of the length correction to the electrical parameter. The electrical parameter may include a saturation current of the IC device. The finding a width correction may include calculating an average width difference between the maximum rectangle and the IC layout contour in a width direction. The finding a length correction may include calculating an average length difference between the maximum rectangle and the IC layout contour in a length direction.

The present disclosure also includes another embodiment of an integrated circuit (IC) design method. The method includes generating a channel contour of an IC device according to a design layout of the IC device and IC manufacturing data; extracting an effective channel rectangle from the channel contour; and simulating the channel contour of the IC device using the effective channel rectangle. The IC design method may further include extracting an electrical parameter of the IC device from the simulation of the channel contour utilizing the effective channel rectangle.

In one embodiment of the disclosed method, the generating of the channel contour includes simulating a design channel layout based on manufacturing data. In another embodiment, the manufacturing data includes statistical lithography data. The statistical lithography data may include focus data, energy data, and mask data. In another embodiment, the extracting the effective channel rectangle includes finding a maximum channel rectangle inside the channel contour; and extracting a width correction and a length correction to the maximum channel rectangle based on the channel contour.

The present disclosure also includes another embodiment of an integrated circuit (IC) design method. The method includes providing an IC channel design layout of an IC device; generating an IC channel contour based on the IC design layout and IC manufacturing data; generating an effective channel rectangle based on the IC channel contour; and generating an electrical parameter of the IC device based on the effective channel rectangle.

In one embodiment of the disclosed method, the generating of the effective channel rectangle includes generating an maximum channel rectangle inside the IC channel design layout; and finding a width correction and a length correction to the maximum channel rectangle according to the IC channel contour. The method may further include generating a data library of simulation corresponding to various IC channel design layouts.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments disclosed herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A non-transitory machine-readable storage medium having machine-executable instructions embodied thereon, the instructions for performing an integrated circuit (IC) design method comprising:
    providing an IC layout contour based on an IC design layout of an IC device and IC manufacturing data, the IC layout contour being defined by an overlap region of a gate contour and an active region contour;
    generating a maximum rectangle inside the IC layout contour;
    generating an effective rectangle layout to represent the IC layout contour, wherein the generating an effective rectangle layout includes finding a width correction and a length correction to the maximum rectangle; and
    simulating the IC device using the effective rectangular layout, the simulating including:
        finding a width sensitivity of the width correction to an electrical parameter of the IC device; and
        finding a length sensitivity of the length correction to the electrical parameter.

2. The method of claim 1, wherein the providing of the IC layout contour comprises:
    providing the manufacturing data associated with an IC manufacturing to be implemented to fabricate the IC device;
    providing the IC design layout of the IC device; and
    generating the IC layout contour based on the IC design layout and the IC manufacturing data by simulation.

3. The method of claim 2, wherein the providing of the IC design layout comprises adding optical proximity correction (OPC) features to the IC design layout.

4. The method of claim 2, wherein the generating of the IC layout contour comprises providing lithography data associated with a lithography system of the IC manufacturing.

5. The method of claim 4, wherein the providing of the lithography data comprises:
    providing statistical focus data associated with lithography exposure focus of the lithography system;
    providing statistical energy data associated with lithography exposure dose of the lithography system; and
    providing statistical mask data of a mask pattern having the IC design layout.

6. The method of claim 1, wherein the IC layout contour is associated with a channel region of a metal-oxide-semiconductor field-effect transistor (MOSFET).

7. The method of claim 1, wherein the electrical parameter comprises a saturation current of the IC device.

8. The method of claim 1, wherein the finding a width correction comprises calculating an average width difference between the maximum rectangle and the IC layout contour in a width direction.

9. The method of claim 1, wherein the finding the length correction to the maximum rectangle includes:
    calculating an average length difference between the maximum rectangle and the IC layout contour in a length direction.

10. A non-transitory machine-readable storage medium having machine-executable instructions embodied thereon, the instructions for performing an integrated circuit (IC) design method comprising:
    providing an IC design layout of an IC device;
    simulating, with manufacturing data, a manufacturing process to generate a virtual fabricated feature corresponding to a feature of the IC design layout, the virtual fabricated feature represented by a feature contour;
    generating a maximum rectangle inside of the feature contour, the maximum rectangle being the largest rectangle that will fit inside of the feature contour;
    applying a width correction and a length correction to the maximum rectangle to generate an effective rectangle;

simulating the electrical performance of the IC device using the effective rectangle, the simulating including:
   finding a width sensitivity of the width correction to an electrical parameter of the IC device; and
   finding a length sensitivity of the length correction to the electrical parameter.

11. The method of claim 10, wherein the applying the width correction and the length correction to the maximum rectangle includes:
   calculating an average width difference between the maximum rectangle and the feature contour in a width direction;
   calculating an average length difference between the maximum rectangle and the feature contour in a length direction;
   adding the average width difference to the width of the maximum rectangle; and
   adding the average length difference to the length of the maximum rectangle.

12. The method of claim 10, wherein the simulating a manufacturing process includes:
   generating a gate electrode contour and an active region contour, wherein an overlap region of the gate electrode contour and the active region contour defines the feature contour.

13. The method of claim 12, wherein the feature contour is a channel contour, the channel contour representing a virtual fabricated channel region of a metal-oxide-semiconductor field-effect transistor (MOSFET).

14. The method of claim 10, wherein the electrical parameter comprises a saturation current of the IC device.

15. The method of claim 10, wherein the simulating the manufacturing process includes utilizing lithography data associated with a lithography system used in the manufacturing process.

16. The method of claim 15, wherein the utilizing lithography data includes:
   utilizing statistical focus data associated with lithography exposure focus of the lithography system;
   utilizing statistical energy data associated with a lithography exposure dose of the lithography system; and
   utilizing statistical mask data of a mask pattern having the IC design layout.

17. The method of claim 10, wherein the simulating the electrical performance includes:
   generating simulation results;
   storing the simulation results in a design data library, the design data library being used for future design simulation.

18. The method of claim 10, wherein the providing of the IC design layout includes adding optical proximity correction (OPC) features to the IC design layout.

* * * * *